(12) United States Patent
Kihara et al.

(10) Patent No.: US 6,476,877 B2
(45) Date of Patent: *Nov. 5, 2002

(54) COLOR CORRECTION APPARATUS, COLOR CORRECTION CONTROLLER, AND COLOR CORRECTION SYSTEM

(75) Inventors: Taku Kihara; Hiroshi Higuchi, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,842

(22) Filed: Sep. 2, 1997

(65) Prior Publication Data

US 2001/0009438 A1 Jul. 26, 2001

(30) Foreign Application Priority Data

Sep. 3, 1996 (JP) ............................................. 8-252358

(51) Int. Cl.[7] ................................................. H04N 9/64
(52) U.S. Cl. ........................ 348/650; 348/649; 348/645; 348/223
(58) Field of Search ................................. 348/223, 187, 348/188, 222, 650, 655, 645, 658, 256, 225, 649, 652, 713, 703, 272, 712; 382/167; 358/20, 518

(56) References Cited

U.S. PATENT DOCUMENTS

| | | | | |
|---|---|---|---|---|
| 4,379,292 A | * | 4/1983 | Minato et al. ............... | 348/655 |
| 4,414,573 A | | 11/1983 | Griesshaber et al. ........ | 358/163 |
| 4,608,593 A | | 8/1986 | Miyaji et al. ................. | 358/10 |
| 5,181,105 A | * | 1/1993 | Udagawa et al. ............ | 348/655 |
| 5,241,373 A | * | 8/1993 | Kanamori et al. ........... | 348/645 |
| 5,260,774 A | | 11/1993 | Takayama ..................... | 358/29 |
| 5,305,094 A | * | 4/1994 | Belmares-Sarabis et al. ............................ | 348/651 |
| 5,406,394 A | * | 4/1995 | Numakura et al. .......... | 358/518 |
| 5,428,465 A | * | 6/1995 | Kanamori et al. ........... | 358/523 |
| 5,475,441 A | * | 12/1995 | Parulski et al. .............. | 348/552 |
| 5,509,111 A | * | 4/1996 | Hong et al. .................. | 395/131 |
| 5,552,904 A | * | 9/1996 | Ryoo et al. .................. | 358/518 |
| 5,633,953 A | * | 5/1997 | Kouzaki ....................... | 382/167 |
| 5,668,596 A | * | 9/1997 | Vogel .......................... | 348/222 |
| 5,742,520 A | * | 4/1998 | Uchikawa et al. ........... | 382/167 |
| 5,799,105 A | * | 8/1998 | Tao .............................. | 348/187 |
| 5,828,781 A | * | 10/1998 | Nakano ........................ | 382/167 |
| 5,917,939 A | * | 6/1999 | Ohta et al. ................... | 382/167 |
| 5,930,388 A | * | 7/1999 | Murakami et al. ........... | 358/518 |
| 5,982,941 A | * | 11/1999 | Loveridge et al. ........... | 382/154 |

* cited by examiner

Primary Examiner—Wendy R. Garber
Assistant Examiner—Mitchell White
(74) Attorney, Agent, or Firm—Frommer Lawrence & Haug LLP; William S. Frommer; Glenn F. Savit

(57) ABSTRACT

The invention provides a technique of making color adjustment for a great number of colors among different imaging apparatus. In the process of making color adjustment among a plurality of cameras, a color correction processing unit disposed in a CCU of each camera detects data associated with lightness, hue, and saturation for a plurality of specified colors. The detected data is transmitted as color data to a CPU. According to the color data supplied from each CCU, the CPU divides the color space into a plurality of areas, and calculates setting data which is required by the color correction processing unit to correct the lightness, hue, and saturation. The resultant setting data is transmitted to the color correction processing unit. In actual use in a normal operation mode, the color correction processing unit corrects the lightness, hue, and saturation according to the procedure determined for each area in accordance with the setting data.

8 Claims, 11 Drawing Sheets

COLOR CORRECTION APPARATUS, COLOR CORRECTION CONTROLLER, AND COLOR CORRECTION SYSTEM

BACKGROUND OF THE INVENTION

1. Field of the Invention

The present invention relates to a color correction apparatus, a color correction controller, and a color correction system, for performing color adjustment among imaging apparatus.

2. Description of the Related Art

In video cameras for use in broadcast stations, it is required that the color characteristics of each video camera (hereinafter referred to simply as a camera) be precisely adjusted. However, in imaging apparatus such as cameras for use in broadcast stations, a difference in the output image among cameras can occur due to slight variations in spectral characteristics of color filters or color separation prisms disposed in front of an image sensor device such as a CCD (charge coupled device). To avoid the above problem, the inventors of the present invention have proposed a technique of making color adjustment for each camera using a linear matrix circuit which is generally disposed in the camera for use in broadcast stations. The linear matrix circuit serves to electronically compensate for an error in the color of the reproduced image caused by the difference in the spectral characteristic between a camera and the ideal spectral characteristic for example according to the NTSC standard. In this technique of compensating for the color difference among cameras using the linear matrix circuit, the same colors for example colors of a color chart are measured by two different imaging apparatus, and the coefficients of the linear matrix circuit are determined by means of calculation based on the data of the colors so that the differences in the colors between the two imaging apparatus are minimized. The resultant coefficients are given to the linear matrix circuit.

The color adjustment process using the linear matrix circuit is briefly described below. The linear matrix circuit performs a matrix calculation according to the following equation (1).

$$R_o = R_i + a \times (R_i - G_i) + b \times (R_i - B_i)$$
$$G_o = G_i + c \times (G_i - R_i) + d \times (G_i - B_i)$$
$$B_o = B_i + e \times (B_i - R_i) + f \times (B_i - G_i) \quad (1)$$

where $R_i$, $G_i$, and $B_i$ are red, green, and blue signals which are input to the linear matrix circuit, $R_o$, $G_o$, and $B_o$ are red, green, and blue signal which are output from the linear matrix circuit, and a–f are coefficients which are determined such that the color difference among cameras is minimized.

The color adjustment process is performed as follows. The image of a particular color of a color chart such as Macbeth Color Chart (trade name) is taken by each camera which is to be adjusted, and the levels of the obtained R, C, and B signals are detected. This process is performed repeatedly for a plurality of desired colors. The levels of the R, G, and B signals detected by a reference camera are substituted into $R_o$, $G_o$, and $B_o$, respectively, of equation (1), for each color. The levels of the R, G. and B signals detected by a camera which is to be adjusted relative to the reference camera are substituted into $R_i$, $G_i$, and $B_i$, respectively, of equation (1), for each color. Then the coefficients a–f are calculated.

In the above color adjustment method using the linear matrix circuit, when the color adjustment is performed for two colors, it is possible to uniquely determine the coefficients a–f so that the two cameras have the same characteristics for the selected two colors. However, in the case where the color adjustment is performed for three or more colors, it is generally impossible to uniquely determine the coefficients a–f. In this case, the coefficients a–f are determined such that the sum of squared errors of the respective colors among cameras is minimized using for example the least squares method. This means that it is difficult to eliminate the difference for all colors among cameras although it is possible to approximately make adjustment for a plurality of colors.

In view of the above problem in the conventional technique, it is an object of the present invention to provide a color correction apparatus, color correction controller, and color correction system, capable of making color adjustment among imaging apparatus for a great number of colors.

SUMMARY OF THE INVENTION

According to a first aspect of the invention, there is provided a color correction apparatus for use in an imaging apparatus, the imaging apparatus including imaging means for sensing the image of a subject and generating a signal including information about the colors of the subject, the color correction apparatus comprising:

color representation data generating means for generating color representation data representing colors, in accordance with the signal generated by the imaging means in the image sensing operation; and correction means which divides the color space in which the color representation data is represented in coordinates of the color space into a plurality of regions, and corrects the color representation data generated by the color representation data generating means, in accordance with a procedure determined for each region of the color space thereby adjusting a color represented by the signal generated by the imaging means with respect to a reference color.

According to a second aspect of the present invention, there is provided a color correction controller for controlling correction means provided in an imaging apparatus, the imaging apparatus comprising:

imaging means for sensing the image of a subject and generating a signal including information about the colors of the subject;

color representation data generating means for generating color representation data representing colors, in accordance with the signal generated by the imaging means in the image sensing operation; and the correction means which divides the color space in which the color representation data is represented in coordinates of the color space into a plurality of regions, and corrects the color representation data generated by the color representation data generating means, in accordance with a procedure determined for each region of the color space thereby adjusting a color represented by the signal generated by the imaging means with respect to a reference color;

the color correction controller comprising procedure determining means for determining the procedure of dividing the color space into the plurality of regions corresponding to a plurality of particular colors, and determining a correction procedure performed by the correction means for each region, in accordance with the signal which is generated by the imaging means when sensing the plurality of particular colors and also in accordance with the information representing references for the plurality of particular colors, so that the color correction controller controls the correction means in accordance with the correction procedure determined.

According to a third aspect of the present invention, there is provided a color correction system for use with an imaging apparatus, the imaging apparatus including imaging means for sensing the image of a subject and generating a signal including information about the colors of the subject, the color correction system comprising:

color representation data generating means for generating color representation data representing colors, in accordance with the signal generated by the imaging means in the image sensing operation;

correction means which divides the color space in which the color representation data is represented in coordinates of the color space into a plurality of regions, and corrects the color representation data generated by the color representation data generating means, in accordance with a procedure determined for each region of the color space thereby adjusting a color represented by the signal generated by the imaging means with respect to a reference color; and procedure determining means for determining the procedure of dividing the color space into the plurality of regions corresponding to a plurality of particular colors, and determining a correction procedure performed by the correction means for each region, in accordance with the signal which is generated by the imaging means when sensing the plurality of particular colors and also in accordance with the information representing references for the plurality of particular colors, so that the color correction controller controls the correction means in accordance with the correction procedure determined.

In the color correction apparatus according to the first aspect of the present invention, the color representation data generating means generates color representation data representing colors in accordance with the signal generated by the imaging means, and correction means corrects the color representation data in accordance with the correction procedure determined for each region in the color space so that the colors represented by the signal generated by the imaging means is adjusted with respect to the reference colors.

In the color correction controller according to the second aspect of the present invention, for each region in the color space corresponding to the plurality of particular colors, the procedure determining means determines the correction procedure performed by the correction means of the imaging apparatus, in accordance with the signal which is generated by the imaging means when sensing the plurality of particular colors and also in accordance with the information representing references for the plurality of particular colors, whereby the color correction controller controls the correction means in accordance with the correction procedure determined.

In the color correction system according to the third aspect of the present invention, the procedure determining means determines, for each region in the color space corresponding to the plurality of particular colors, the correction procedure performed by the correction means of the imaging apparatus, in accordance with the signal which is generated by the imaging means when sensing the plurality of particular colors and also in accordance with the information representing references for the plurality of particular colors, the color representation data generating means generates color representation data representing colors in accordance with the signal generated by the imaging means, and correction means corrects the color representation data in accordance with the correction procedure determined for each region in the color space so that the colors represented by the signal generated by the imaging means is adjusted with respect to the reference colors.

DESCRIPTION OF THE PREFERRED EMBODIMENTS

Figure 1:
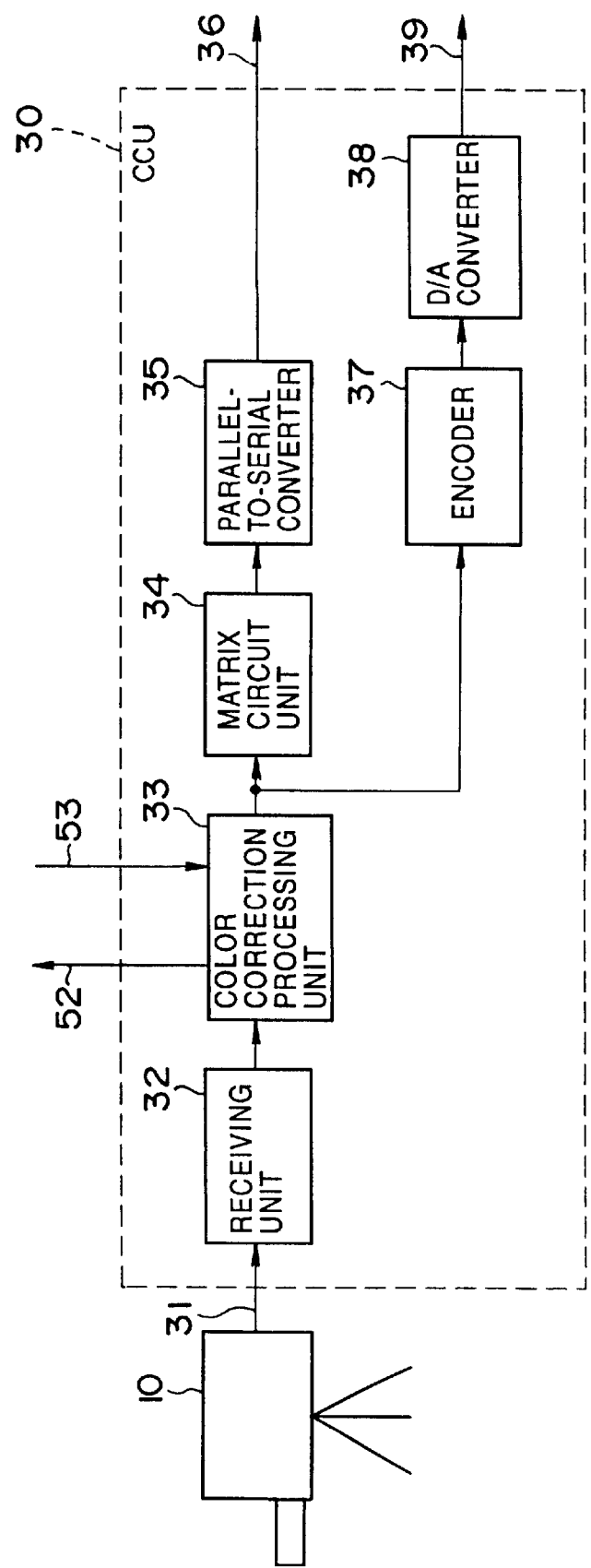
FIG. 1 is a block diagram illustrating a camera system including a color correction apparatus according to a first embodiment of the present invention.

The present invention is described in further detail below with reference to preferred embodiments in conjunction with the accompanying drawings. FIG. 1 is a block diagram illustrating a camera system including a color correction apparatus according to a first embodiment of the present invention. The camera system comprises: a camera 10 serving as the main part of an imaging apparatus; and a camera control unit (hereinafter referred to as a CCU) 30 disposed separately from the camera 10 and connected to the camera 10 so that the camera control unit 30 serves as a controller for controlling the camera 10. The camera 10 includes a camera head unit (hereinafter referred to as a CHU) serving as an electronic circuit.

Figure 2:
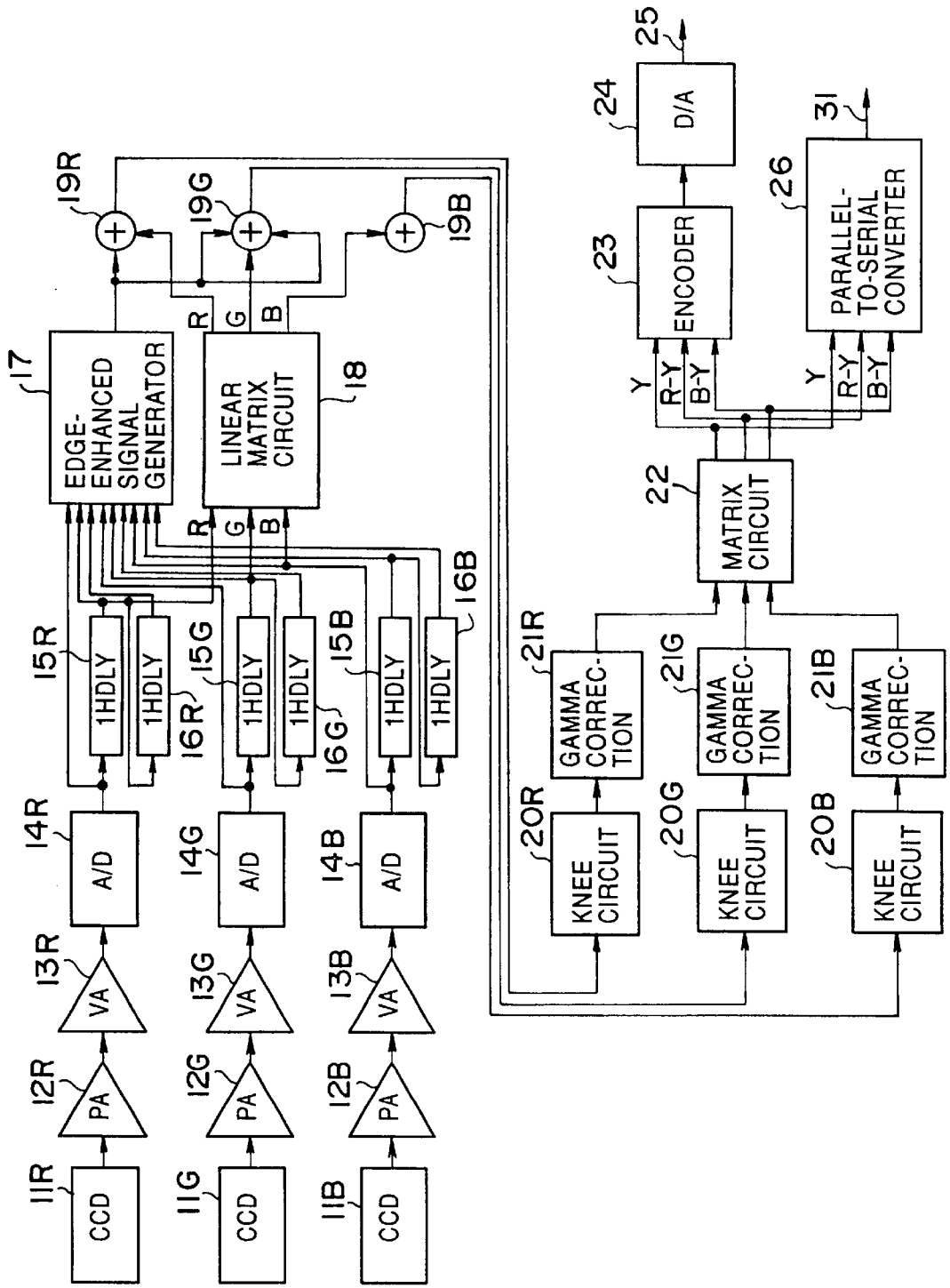
FIG. 2 is a block diagram illustrating the detailed construction of the CHU disposed in the camera shown in FIG. 1.

FIG. 2 is a block diagram illustrating the construction of the CHU disposed in the camera 10 shown in FIG. 1. The CHU includes three CCDs 11R, 11G, and 11B serving as image sensor devices. Light from a subject is separated into red, green, and blue light rays by an imaging optical system including color filters or color separation prisms (not shown). The separated red, green, and blue light rays are focused on the CCDs 11R, 11G, and 11B, respectively. The CCDs 11R, 11G, and 11B sense red, green, and blue images, respectively, and generate a corresponding red signal (hereinafter referred to as an R signal), green signal (hereinafter referred to as a G signal), and blue signal (hereinafter referred to as a B signal), respectively.

The CHU 1 further includes: preamplifiers (denoted as PA in FIG. 1) 12R, 12G, and 12B for amplifying the R, G, and B signals output by the CCDs 11R, 11G, and 11B; video amplifiers (denoted as VA in FIG. 1) 13R, 13G, and 13B for making adjustment on the output signals of the preamplifiers 12R, 12G, and 12B so that a correct black level and white level are obtained; analog-to-digital (hereinafter referred to simply as A/D) converters 14R, 14G, and 14B for converting the output signals of the video amplifiers 13R, 13G, and 13B into digital form; delay circuits 15R, 15G, and 15B for delaying the output signals of the A/D converters 14R, 14G, and 14B by an amount of one horizontal (1H) period; delay circuits 16R, 16G, and 16B for delaying the output signals of the delay circuits 15R, 15G, and 15B by an amount of one horizontal (1H) period; and an edge-enhanced signal generator 17 which receives the output signals of the A/D converters 14R, 14G, and 14B and also the output signals of the delay circuits 15R, 15G, 15B, 16R, 16G, and 16B, and which amplifies the high frequency components of these signals in the horizontal and vertical direction thereby generating an edge-enhanced signal.

The CHU further includes: a linear matrix circuit 18 which receives the output signals of the delay circuits 15R, 15G, and 15B, and compensates for an error in the color caused by the difference in the spectral characteristic between the camera and the ideal spectral characteristic according to for example the NTSC standard; adders 19R, 19G, and 19B for calculating the sums of the R, G, and B signals output by the linear matrix circuit 18 and the edge-enhanced signal output by the edge-enhanced signal generator 17; knee circuits 20R, 20G, and 20B for compressing the high-brightness components of the respective output signals of the adders 19R, 19G, and 19B so as to expand the apparent dynamic range; and gamma correction circuits 21R, 21G, and 21B for making gamma correction on the output signals of the knee circuits 20R, 20G, and 20B by multiplying these output signals by the inverse function of the voltage-brightness characteristic of an image receiving device.

Furthermore, the CHU also includes: a matrix circuit 22 for converting the R, G, and B signals output by the gamma correction circuits 21R, 21G, and 21B to a luminance signal (hereinafter referred to as a Y signal), a red color difference signal (hereinafter referred to as an R-Y signal), and a blue color difference signal (hereinafter referred to as a B-Y signal); an encoder 23 which receives the output signals of the matrix circuit 22 and performs various processes on the received signals, such as color modulation, addition of a sync signal, and summation of the luminance signal and the color signals, thereby generating a color image signal according to the NTSC standard or the PAL standard; a digital-to-analog (hereinafter referred to as D/A) converter 24 for converting the output signal of the encoder 23 to analog form and then outputting the resultant signal as an analog composite signal 25; and a parallel-to-serial converter 26 for converting the output signals of the matrix circuit 22 from parallel form into serial form and then outputting the resultant signal as a serial digital signal 31.

The operation of the CHU shown in FIG. 2 is described below. In the CHU, the R, G, and B signals output by the CCDs 11R, 11G, and 11B are amplified by the preamplifiers 12R, 12G, and 12B, respectively, and then adjusted in terms of the black level and the white level by the video amplifiers 13R, 13G, and 13B. The output signals of the video amplifiers 13R, 13G, and 13B are applied to the A/D converters 14R, 14G, and 14B and converted to digital signals. The resultant signals are delayed by the delay circuits 15R, 15G, and 15B by an amount of one horizontal period and further delayed by the delay circuits 16R, 16G, and 16B by an amount of one horizontal period. The edge-enhanced signal generator 17 receives the output signals of the A/D converters 14R, 14G, and 14B and also the output signals of the delay circuits 15R, 15G, 15B, 16R, 16G, and 16B, and generates an edge-enhanced signal from those received signals. The linear matrix circuit 18 receives the output signals of the delay circuits 15R, 15G, and 15B, and performs color correction on the received signals. The adders 19R, 19G, and 19B calculate the sums of the R, G, and B signals output by the linear matrix circuit 18 and the edge-enhanced signal output by the edge-enhanced signal generator 17. The output signals of the adders 19R, 19G, and 19B are applied to the matrix circuit 22 via the knee circuits 20R, 20G, and 20B and the gamma correction circuits 21R, 21G, and 21B. The matrix circuit 22 converts the received signals to Y, R-Y, and B-Y signals. The resultant signals are applied to the encoder 23 and also to the parallel-to-serial converter 26. The encoder 23 receives the output signals of the matrix circuit 22 and performs various processes such as color modulation, addition of a sync signal, and summation of the luminance signal and the color signals, so as to generate a color image signal according to the NTSC standard or the PAL standard. The D/A converter 24 converts the output signal of the encoder 23 to analog form and then outputting the resultant signal as an analog composite signal. On the other hand, the parallel-to-serial converter 26 converts the output signals of the matrix circuit 22 from parallel form to serial form. The resultant signal is output as a serial digital signal 31, and is applied to the CCU 30 shown in FIG. 1.

Referring to FIG. 1, the construction of the CCU 30 is described below. The CCU 30 includes: a receiving unit 32 for receiving and demodulating the serial digital video signal 31 which is modulated and transmitted from the CHU of the camera 10; a color correction processing unit 33 which receives the output signal of the receiving unit 32, detects data required in color correction process, and performs color correction process; a matrix circuit unit 34 for converting the output signal of the color correction processing unit 33 to a signal in D1 format; a parallel-to-serial converter 35 for converting the output signal of the matrix circuit unit 34 from parallel form into serial form and then outputting the resultant signal as a serial digital video signal 36; an encoder 37 which receives the output signal of the color correction processing unit 33 and performs various processes on the received signal, such as color modulation, addition of a sync signal, and summation of the luminance signal and the color signals, thereby generating a color image signal according to the NTSC standard or the PAL standard; and a D/A converter 38 for converting the output signal of the encoder 37 to analog form and outputting the resultant signal as an analog composite signal 39.

The operation of the CCU 30 shown in FIG. 1 is briefly described below. The serial digital video signal 31, which is modulated and transmitted from the CHU of the camera 10, is input to the receiving unit 32. The receiving unit 32 demodulates the received digital video signal 31 into R, G, and B signals or Y, R-Y, and B-Y signals, which are then applied to the color correction processing unit 33. The color correction processing unit 33 detects data required in color correction process and performs color correction process, as will be described in further detail later. This color correction processing unit 33 serves as the color correction apparatus according to the present embodiment of the invention.

The output signal of the color correction processing unit 33 is input to the matrix circuit unit 34 and also to the encoder 37. The matrix circuit unit 34 converts the R, G, and B signals or Y, R-Y, and B-Y signals output by the color correction processing unit 33 to a signal in D1 format (4:2:2, 10-bit, 27 MHz). The resultant signal is converted by the parallel-to-serial converter 35 from parallel to serial form, and is output from the CCU 30 as a serial digital video signal 36 in SDI (serial digital interface) format (1 bit, 270 MHz). On the other hand, the encoder 37 performs, on the output signal of the color correction processing unit 33, various processes such as color modulation, addition of a sync signal, and summation of the luminance signal and the color signals so as to generate a color image signal according to the NTSC or PAL standard. The output signal of the encoder 37 is converted by the D/A converter 38 to analog form and is output from the CCU 30 as an analog composite signal 39.

In addition to the components shown in FIG. 1, the CCU 30 includes other elements such as a signal generator for generating a sync signal in synchronization with a reference video signal supplied from the outside, a signal processing unit for processing a return video signal supplied from another camera located in the outside, a transmission unit for transmitting a return video signal to the outside, an audio signal processing unit for processing an audio signal, etc. However, these elements are not essential to the present invention, and therefore these are not shown in FIG. 1.

Figure 3:
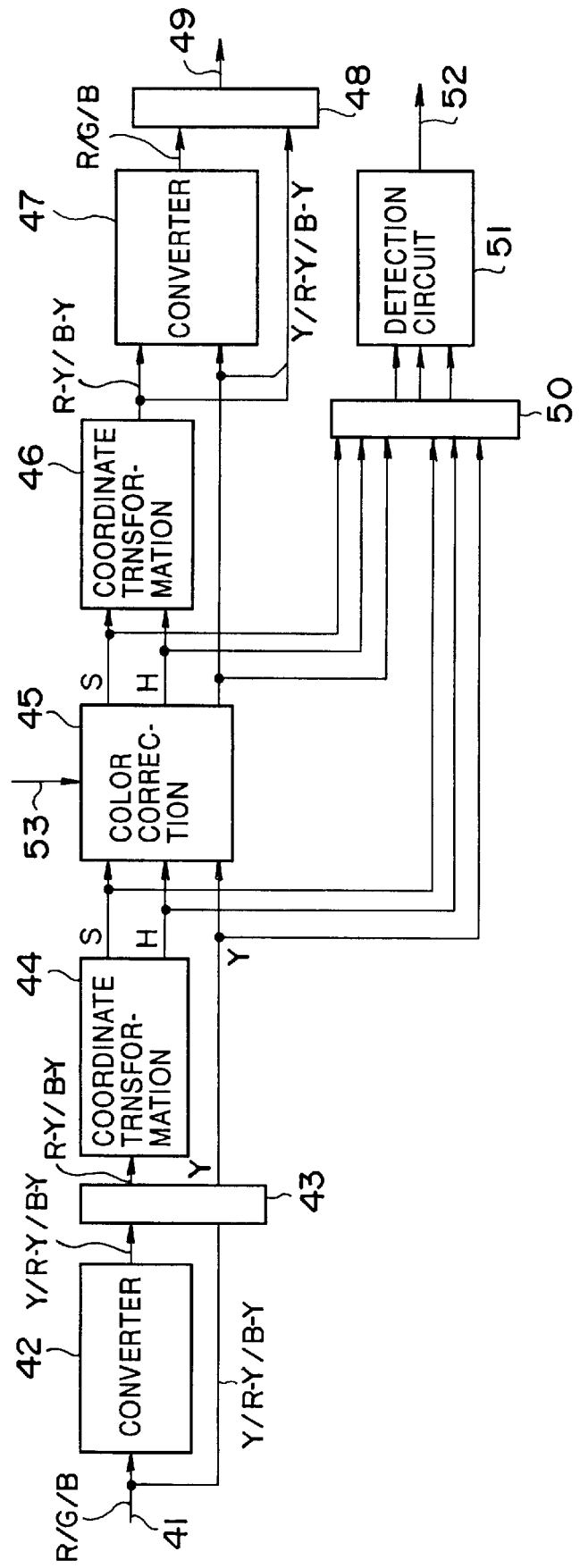
FIG. 3 is a block diagram illustrating the detailed construction of the color correction processing unit disposed in the CCU shown in FIG. 1.

FIG. 3 is a block diagram illustrating the construction of the color correction processing unit 33 in the CCU 30 shown in FIG. 1. The color correction processing unit 33 includes: a conversion circuit 42 which receives signals 41 consisting of R, G, and B signals from the receiving unit 32 and converts the received signals 41 to Y, R-Y, and B-Y signals; a selection switching circuit 43 for selecting either the signals 41 from the receiving unit 32 or the output signals of the conversion circuit 42 and outputting the selected signals; a coordinate transformation circuit 44 for transforming the R-Y and B-Y signals output from the selection switching circuit 43 to a saturation signal S and a hue signal H represented in polar coordinates; and a color correction circuit 45 serving as correction means which receives the saturation signal S and the hue signal H from the coordinate transformation circuit 44 and also receives the Y signal from the selection switching circuit 43 and then performs correction on these received signals as will be described later. The Y signal representing brightness, the saturation signal S, and the hue signal H serve as color data in the present invention. Hereinafter, the symbols Y, S, and H are also used to represent the levels or values of the Y signal, the saturation signal, and the hue signal, respectively.

The color correction processing unit 33 further includes: a coordinate transformation circuit 46 for converting the saturation signal S and the hue signal H output by the color correction circuit 45 to R-Y and B-Y signals represented in orthogonal coordinates; a conversion circuit 47 for converting the Y signal output by the color correction circuit 45 and the R-Y and B-Y signals output by the coordinate transformation circuit 46 to R, G, and B signals; and a selection switching circuit 48 for selecting either the R, G, and B signals output by the conversion circuit 47 or the Y signal output by the color correction circuit 45 and the R-Y and B-Y signals output by the coordinate transformation circuit 46, and then outputting the selected signals as an output signal 49 from the color correction processing unit 33.

The color correction processing unit 33 further includes: a selection switching circuit 50 for selecting either the saturation signal S and the hue signal H output by the coordinate transformation circuit 44 and the Y signal output by the selection switching signal 43 or the saturation signal S, the hue signal H, and the Y signal output by the color correction circuit 45, and outputting the selected signals; and a detection circuit 51 which receives the output signal of the selection switching circuit 50 and detects the levels of the saturation signal S, the hue signal H, and the Y signal generated by the camera when taking the image of a specified particular color, thereby generating color data 52. The resultant color data 52 is transmitted to a CPU (central processing unit) which will be described later. The color correction circuit 45 also receives setting data 53 from the CPU.

Now, the operation of the color correction processing unit 33 shown in FIG. 3 is described briefly. The signals 41 consisting of R, G, and B signals or the Y, R-Y, and B-Y signals are input to the color correction processing unit 33. In the case where the R, G, and B signals are input as the signals 41, these R, G, and B signals are converted to Y, R-Y, and B-Y signals by the conversion circuit 42 and are applied to the selection switching circuit 43 which in turn selects the output signals of the conversion circuit 42 and outputs the selected signals. On the other hand, if the Y, R-Y, and B-Y signals are input as the signals 41, the selection switching circuit 43 selects the signals 41 and outputs these signals. The above selection process makes it possible to accommodate both the R, G, B signals and the Y, R-Y, B-Y signals transmitted from the CHU to the CCU 30.

The R-Y and B-Y signals output from the selection switching circuit 43 are converted to a saturation signal S and a hue signal H by the coordinate transformation circuit 44. The saturation signal S and the hue signal H output from the coordinate transformation circuit 44 and the Y signal output from the selection switching circuit 43 are corrected by the color correction circuit 45. The saturation circuit S and the hue signal H output from the color correction circuit 45 are converted to R-Y and B-Y signals by the coordinate transformation circuit 46. Furthermore, the Y signal output from the color correction circuit 45 and the R-Y and B-Y signals output from the coordinate transformation circuit 46 are converted to R, G, and B signals by the conversion circuit 47. When it is wanted to provide output signals 49 consisting of R, G, and B signals from the color correction processing unit 33, the selection switching circuit 48 selects the R, G, and B signals output from the conversion circuit 47, and the selection switching circuit 48 outputs the selected signals as the output signals 49. On the other hand, when it is wanted to provide output signals 49 consisting of Y, R-Y, and B-Y signals from the color correction processing unit 33, the selection switching circuit 48 selects the Y signal output from the color correction circuit 45 and the R-Y and B-Y signals output from the coordinate transformation circuit 46, and the selection switching circuit 48 outputs the selected signals as the output signals 49. The operation described above is performed when an image of a subject is taken in a normal (actual) operation mode.

In addition to the operation in the normal mode, the color correction processing unit 33 also detects data required by the CPU to calculate setting data. In this detection operation, the camera 10 takes images of a plurality of specified particular colors, and the selection switching circuit 50 selects the saturation signal S and the hue signal H output from the coordinate transformation circuit 44 and the Y signal output from the selection switching circuit 43, wherein the selected signals are applied to the detection circuit 51. The detection circuit 51 detects the levels of the saturation signal S, the hue signal H, and the Y signal for the specified colors, and transmits the result as color data 52 to the CPU. Alternatively, the detection circuit 51 may detect the levels of the R, G, and B signals input to the conversion circuit 42 or the levels of the Y, R-Y, and B-Y signals output from the selection switching circuit 43, and the CPU may calculate the levels of the saturation signal S, the hue signal H, and the Y signal from the levels of the R G, and B signals or from the levels of the Y, R-Y, and B-Y signals.

In this color correction processing unit, the input or output signals of the color correction circuit 45 can be selected via the selection switching circuit 50 so that the signals input to the color correction circuit 45 and the signals output therefrom can be compared with each other.

Figure 4:
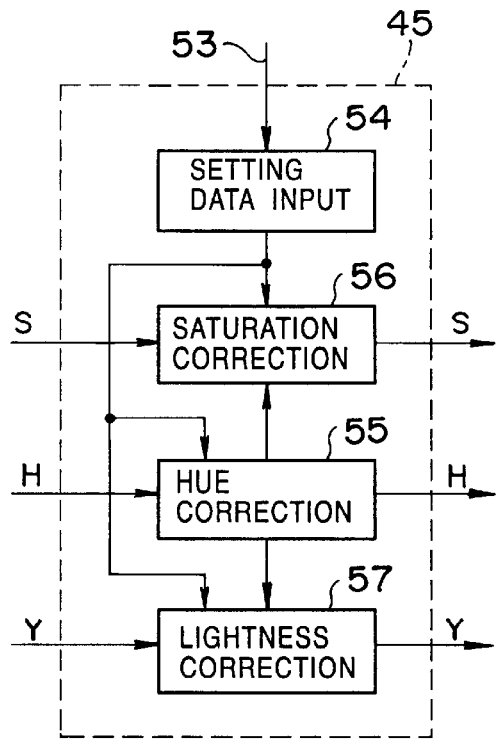
FIG. 4 is a block diagram illustrating the detailed construction of the color correction circuit shown in FIG. 3.

FIG. 4 is a block diagram illustrating the construction of the color correction circuit 45 shown in FIG. 3. The color correction circuit 45 includes: a setting data input unit 54 via which setting data 53 from the CPU is input; a hue correction unit 55 for correcting the hue signal H output from the coordinate transformation circuit 44 in accordance with the result of the calculation performed using the setting data input via the setting data input unit 54; a saturation color correction unit 56 for correcting the saturation color S output from the coordinate transformation circuit 44 in accordance with the result of the calculation performed using the setting data given via the setting data input unit 54 and the corrected hue signal output from the hue correction unit 55; and a lightness correction unit 57 for correcting the Y signals output from the selection switching circuit 43 in accordance with the result of the calculation performed using the setting data given via the setting data input unit 54 and the corrected hue signal output from the hue correction unit 55, and then outputting the resultant signal.

Figure 5:
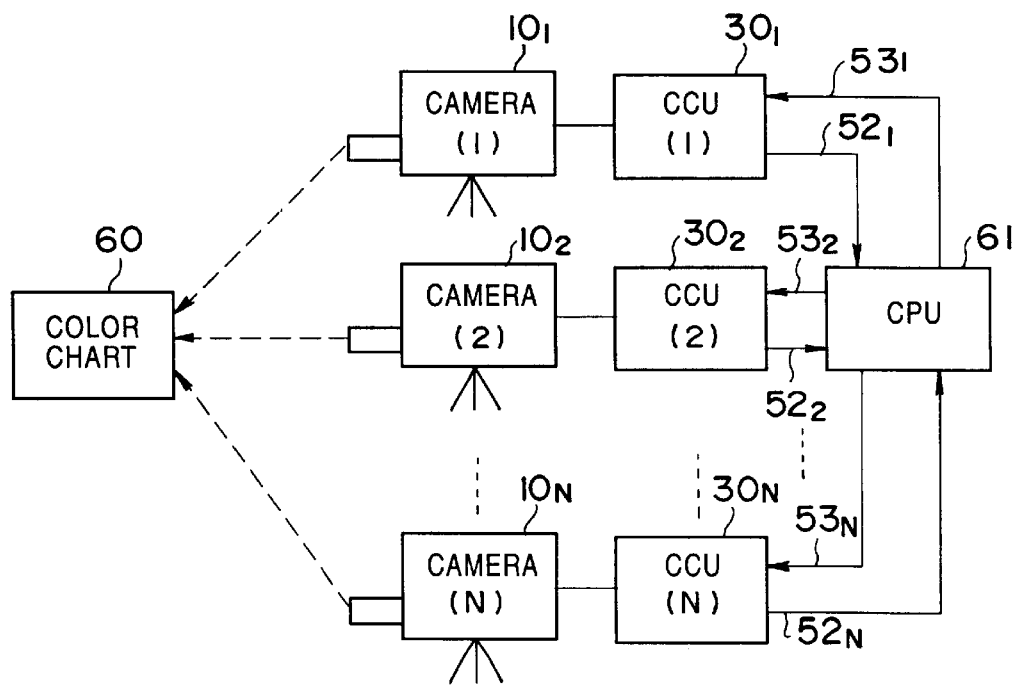
FIG. 5 illustrates an example of a system used to make color adjustment among a plurality of cameras.

FIG. 5 illustrates an example of a system including a plurality of cameras to be adjusted in terms of colors according to the present embodiment of the invention. In this specific example, the color characteristics of a camera (1) $10_1$, camera (2) $10_2$, . . . , camera (N) $10_n$ are adjusted relative to the camera (1) $10_1$. The camera (1) $10_1$ through the camera (N) $10_N$ are connected to a CCU (1) $30_1$ through a CCU (N) $30_N$, respectively. The CHU of each camera (1) $10_1$ through (N) $10_N$ is constructed as shown in FIG. 2, and each CCU (1) $30_1$ through (N) $30_N$ is constructed as shown in FIGS. 1 and 3. The CCUs (1) $30_1$ through (N) $30_N$ are connected to a single CPU 61. The CPU 61 receives color data $52_1$ through $52_N$ from the CCUs (1 through N) $30_1$ through $30_N$, respectively, and calculates the setting data $53_1$ through $53_N$ for the respective CCUs (1 through N) $30_1$ through $30_N$. The calculated setting data are transmitted to the corresponding CCUs (1 through N) $30_1$ through $30_N$. The CPU 61 serves as a color correction apparatus according to the present embodiment of the invention, and the color correction processing units 33 of the CCUs 30 and the CPU 61 forms a color correction system according to the present embodiment of the invention. The CPU 61 includes a ROM (read only memory), a RAM (random access memory), and other components so that the CPU 61 can calculate the setting data and perform other calculations by executing a program stored in the ROM using the RAM as a working area.

In the process of adjusting the color characteristics among the plurality of cameras using the system shown in FIG. 5, a plurality of specified particular colors of for example a color chart 60 are sensed by the cameras (1 through N) $10_1$ through $10_N$ under the same conditions. A Macbeth color chart (trade name) or the like is generally employed as the color chart 60. Although, in FIG. 5, the color chart 60 is measured by the cameras (1 through N) $10_1$ through $10_N$ at the same time from different positions, this is only for convenience in description. In practice, the color chart 60 is measured by the cameras (1 through N) $10_1$ through $10_N$ at the same position. More specifically, the camera (1) $10_1$ is set on a tripod and the color chart 60 is measured by the camera (1) $10_1$. After that the camera on the tripod is replaced by the cameras (2 through N) $10_2$ through $10_N$ from one to another while maintaining the tripod at the same position, and the same color chart 60 is measured by each camera (2 through N) $10_2$ through $10_N$.

Figure 6:
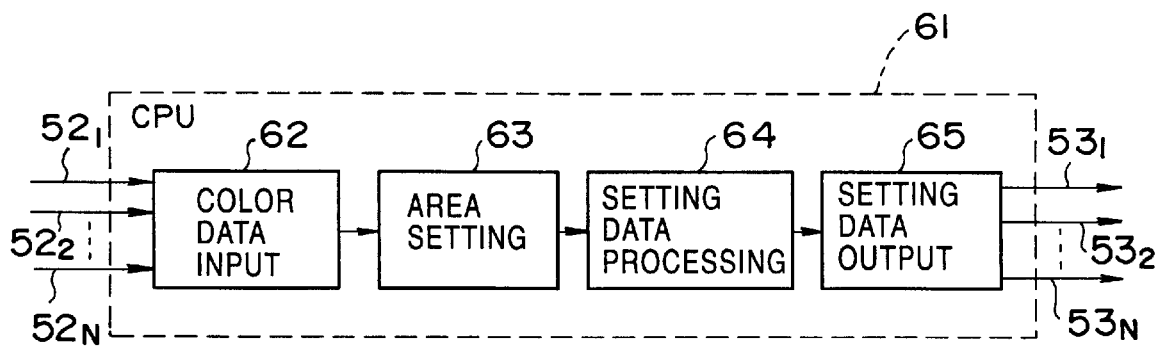
FIG. 6 is a functional block diagram illustrating the function of the CPU shown in FIG. 5.

FIG. 6 is a functional block diagram illustrating the function of the CPU 61 shown in FIG. 5. As shown in FIG. 6, the CPU 61 includes: a color data input unit 62 via which color data $52_1$ through $52_N$ from the respective CCUs (1 through N) $30_1$ through $30_N$ are input; an area (region) setting unit 63 for setting a plurality of areas by dividing the color space whose coordinates represent lightness, hue, and saturation, respectively, in accordance with the color data $52_1$ given via the color data input unit 62 so that the divided areas correspond to the particular colors; a setting data processing unit 64 for calculating the setting data for each area and for each CCU (1 through N) $30_1$ through $30_N$ in accordance with the color data $52_1$ given from the CCU (1) $30_1$ and also the color data $52_2$ through $52_N$ given from the CCUs (2 through N) $30_2$ through $30_N$; and a setting data output unit 65 for transmitting the setting data $53_2$ through $53_N$ determined by the setting data processing unit 64 to the CCUs (1 through N) $30_1$ through $30_N$, respectively.

The procedure of making color adjustment among the cameras $10_1$ through $10_N$ relative to the camera (1) $10_1$ in the system shown in FIG. 5 is described below. At the first step of the color adjustment procedure, a plurality of particular colors of for example the color chart 60 are sensed by the cameras (1 through N) $10_1$ through $10_N$ under the same conditions. The video signal 31 which is modulated and transmitted from the CHU of each camera $10_1$ through $10_N$ is demodulated by the receiving unit 32 of each CCU $30_1$ through $30_N$. In the color correction processing unit 33, the selection switching circuit 50 selects the saturation signal S and the hue signal H output from the coordinate transformation circuit 44 and the Y signal output from the selection switching circuit 43, and transmits the selected signals to the detection circuit 51. The detection circuit 51 detects the levels of the saturation signal S, the hue signal H, and the Y signal for the plurality of particular colors, and transmits the results as color data $52_1$ through $52_N$ to the CPU 61. The CPU 61 receives these color data $52_1$ through $52_N$, and performs the following operation.

Figure 7:
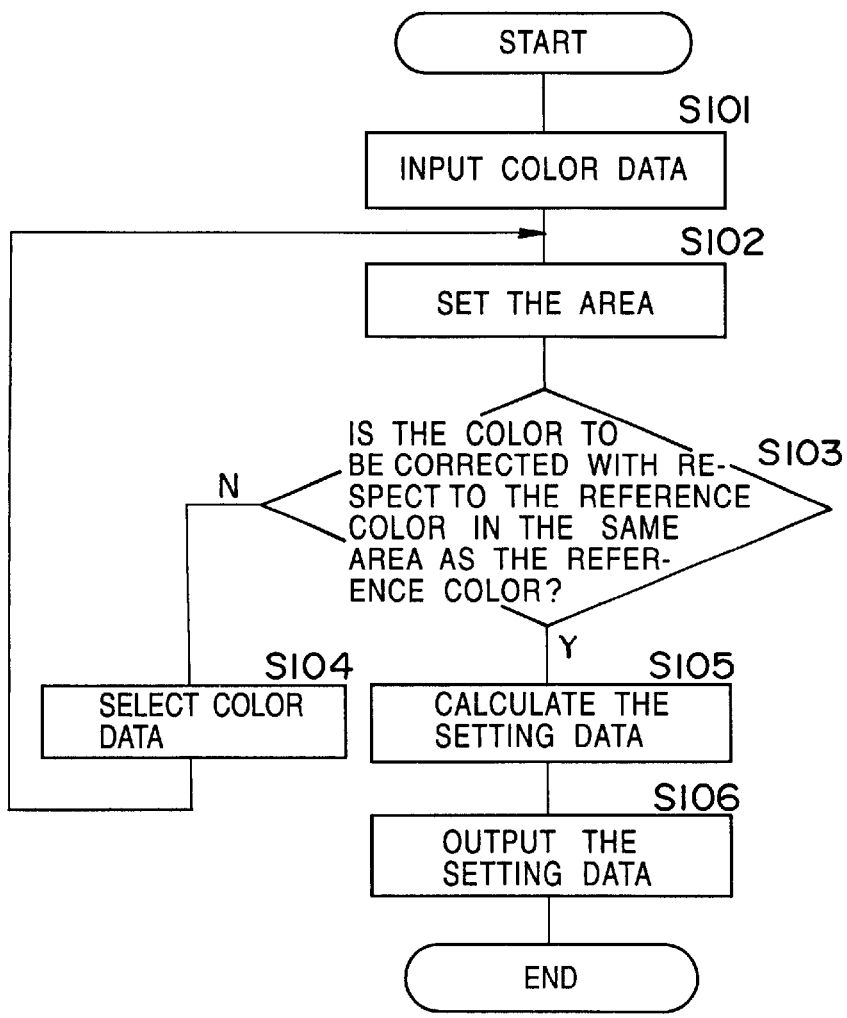
FIG. 7 is a flow chart illustrating the operation performed by the CPU shown in FIG. 5 during the color adjustment process.

FIG. 7 is a flow chart illustrating the operation performed by the CPU 61 in the color adjustment process. As shown in FIG. 7, the CPU 61 receives the color data $52_1$ through $52_N$ from the respective CCUs $30_1$ through $30_N$ via the color data input unit 62 (in step S101). The area setting unit 63 sets a plurality of areas (regions) by dividing the color space in accordance with the color data $52_1$ from the CCU (1) $30_1$ so that the divided areas correspond to the plurality of particular colors (in step S102). Then in the following step (in step S103), the CPU 61 judges whether the color data generated by each camera (2 through N) $30_2$ through $30_N$ to be adjusted relative to the camera (1) $30_1$ is located within the same area as the color data generated by the reference camera (1) $30_1$ wherein the judgement is performed for each of the plurality of specified colors. If there is a set (or sets) of color data which are not all located in the same area (that is, the judgement conclusion is negative), color data selection is performed (in step S104) in such a manner that some set of color data associated with some color of the plurality of specified colors is discarded so that the remaining sets of color data no longer include such a set of color data which are not all located in the same area. The above color data selection may be performed either in a manual fashion under the control and judgement of a user or in an automatic fashion under the control and the judgement of the CPU 61. After completion of the color data selection, the process returns to step S102. If it is concluded in step S103 that there is no such a set of color data which are not all located in the same area (that is, if the judgement conclusion in step S103 is yes), the setting data processing unit 64 calculates the setting data for each area and for each CCU (1 through N) $30_1$ through $30_N$ in accordance with the color data $52_1$ from the CCU (1) $30_1$ and also the color data $52_2$ through $52_N$ from the CCUs (2 through N) $30_2$ through $30_N$ (in step S105). In this calculation, since the CCU (1) $30_1$ corresponds to the reference camera (1) $10_1$, the setting data for the CCU (1) $30_1$ is set such that no color correction is performed by the color correction circuit 45 in the CCU (1) $30_1$. Then the CPU 61 outputs the resultant setting data $53_1$ through $53_N$ to the CCUs (1 through N) $30_1$ through $30_N$, respectively, via the setting data output unit 65 (in step S106). Thus, the setting data calculation process is complete. The setting data $53_1$ through $53_N$ transmitted to the CCUs (1 through N) $30_1$ through $30_N$ are input into the color correction circuits 45 of the respective CCUs via the corresponding setting data input units 54. The method of setting the areas and the contents of the setting data will be described in further detail later.

The operation of the CCU 30 during normal use after completion of the color adjustment according to the procedure described above is now described below. The modulated video signal 31 transmitted from the CHU of the camera 10 is demodulated by the receiving unit 32 of the CCU 30 and then applied to the color correction processing unit 33. In the color correction processing unit 33, the R-Y and B-Y signals output from the selection switching circuit 43 are converted by the coordinate transformation circuit 44 to a saturation signal S and a hue signal H. The saturation signal S and the hue signal H output from the coordinate transformation circuit 44 and the Y signal output from the selection switching circuit 43 are applied to the color correction circuit 45. In the color correction circuit 45, the setting data input unit 54 receives and holds the setting data 53 supplied from the CPU 61. In the color correction circuit 45, the hue correction unit 55 corrects the hue signal H according to the correction processing procedure determined on the basis of the setting data. Then the saturation correction unit 56 corrects the saturation signal S according to the correction processing procedure determined on the basis of the setting data and the information about the correction result of the hue correction unit 55. The lightness correction unit 57 corrects the Y signal according to the correction processing procedure determined on the basis of the setting data and the information about the correction result of the hue correction unit 55. The operation after the correction by the color correction circuit 45 is performed as described earlier. The correction processing performed by the hue correction unit 55, the saturation correction unit 56, and the lightness correction unit 57 of the color correction circuit 45 will be described in detail below.

The correction process, the area setting process, and the contents of the setting data will be described below for each of the hue correction unit 55, the saturation correction unit 56, and the lightness correction unit 57 of the color correction circuit 45.

Figure 8:
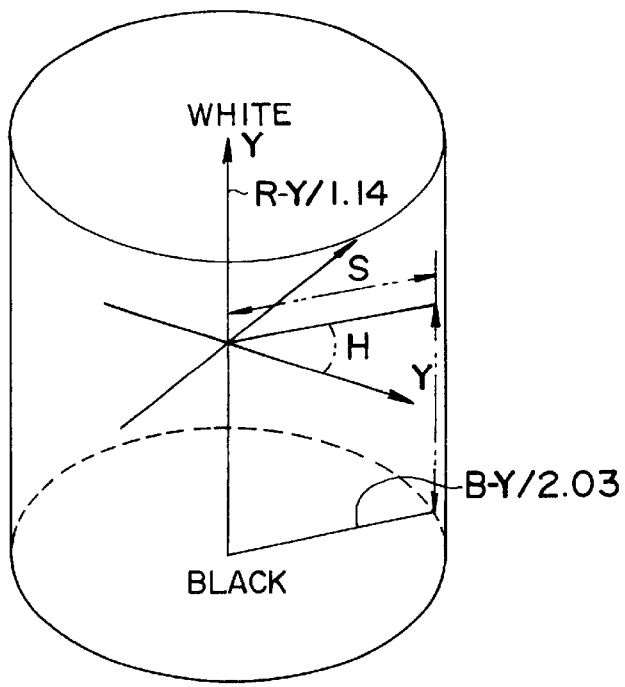
FIG. 8 illustrates a color space in which lightness, hue, and saturation are represented in coordinates of the color space.

First, the relationships between the Y, R-Y, B-Y signals and the lightness, hue, saturation are described. FIG. 8 illustrates a color space in which the lightness, hue, and saturation are represented in coordinates of the color space. In this color space, the axis in a direction of height (hereinafter referred to as the Y axis) represents lightness (brightness) Y, the distance from the Y axis in a plane perpendicular to the Y axis represents saturation S, and the rotational angle (phase) in the plane perpendicular to the Y axis and relative to a particular axis represents hue H. In the plane perpendicular to the Y axis, the axis at which the hue becomes 0° is the B-Y2.03 axis (hereinafter referred to as the B-Y axis) and the axis perpendicular to this B-Y axis is the R-Y/1.14 axis (hereinafter referred to as the R-Y axis).

Figure 9:
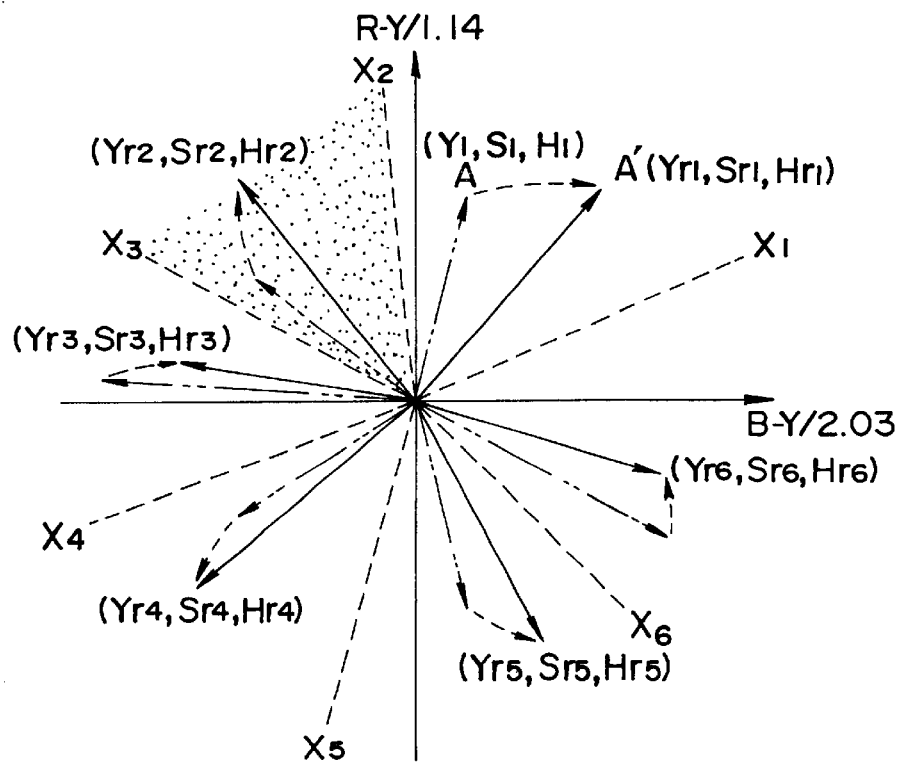
FIG. 9 is a schematic representation of the method of setting areas according to the first embodiment of the invention.

The method of setting the areas is now described below. In the process of making color adjustment among a plurality of cameras as shown in FIG. 5, a plurality of specified particular colors of for example a color chart 60 are sensed by each camera under the same conditions, and the values of lightness, saturation, and hue for each color are detected by the detection circuit 51 shown in FIG. 3. In this specific example, it is assumed that the color adjustment is performed for six different colors. Herein, as shown in FIG. 9, the sets of data (brightness, saturation, hue) for the six colors sensed by the reference camera (camera (1) $10_1$) are represented by $(Y_{r1}, S_{r1}, H_{r1})$, $(Y_{r2}, S_{r2}, H_{r2})$, $(Y_{r3}, S_{r3}, H_{r3})$, $(Y_{r4}, S_{r4}, H_{r4})$, $(Y_{r5}, S_{r5}, H_{r5})$, and $(Y_{r6}, S_{r6}, H_{r6})$, and the sets of data (brightness, saturation, hue) for the six colors sensed by each camera (the camera (2) $10_1$ through the camera (N) $10_N$) to be adjusted are represented by $(Y_1, S_1, H_1)$, $(Y_2, S_2, H_2)$, $(Y_3, S_3, H_3)$, $(Y_4, S_4, H_4)$, $(Y_5, S_5, H_4)$, $(Y_6, S_6, H_6)$. When the above data sets are obtained, color adjustment is performed for each data set $(Y_n, S_n, H_n)$ relative to $(Y_{rn}, S_{rn}, H_{rn})$ (for n=1, 2, ..., 6).

Figure 10:
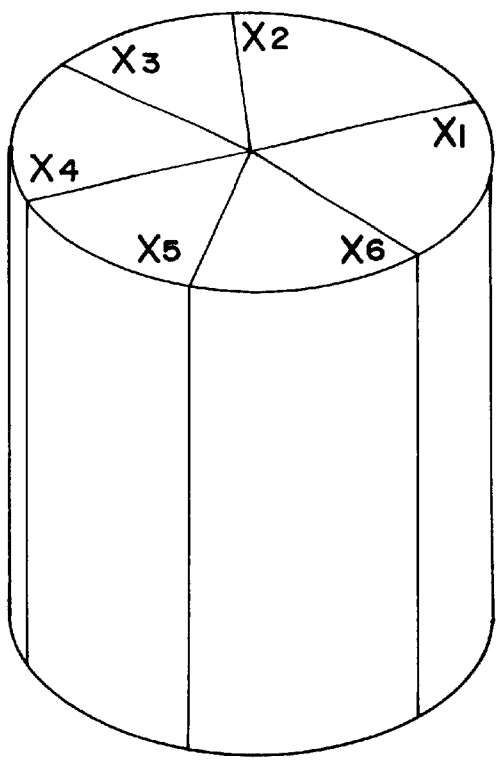
FIG. 10 is a schematic representation of the method of setting areas according to the first embodiment of the invention.

The area setting is performed using the data $(Y_{r1}, S_{r1}, H_{r1})$, ..., $(Y_{r6}, S_{r6}, H_{r6})$. The area boundaries are defined, as shown in FIG. 9, by the respective center lines between adjacent hue data $H_{r1}$, ..., $H_{r6}$ of the six colors sensed by the reference camera. For example, the boundary between the areas $(Y_{r1}, S_{r1}, H_{r1})$ and $(Y_{r2}, S_{r2}, H_{r2})$ is defined by the area boundary line $X_2$ located at the center $(H_{r1}+H_{r2})/2$ between the hue data $H_{r1}$ and $H_{r2}$. A total of six area boundary lines $X_1$, ..., $X_6$ are defined in a similar manner, and thus a total of six areas are defined wherein each area is located between two boundary lines. Although in FIG. 9 the areas are shown in the plane perpendicular to the Y axis, the actual areas in the color space are three-dimensional regions separated from one another by boundary planes extending in a vertical direction from the respective boundary lines $X_1, \ldots, X_6$ as shown in FIG. 10.

In the present embodiment, color adjustment processing is performed within each area created in the above-described manner. That is, it is required that each hue data $H_n$ to be adjusted should be located within the same area as the reference hue data $H_{rn}$. Since the color adjustment processing is performed in a similar manner for each area, the area between $X_1$ and $X_2$ is taken as an example and the adjustment processing for this area in terms of hue, saturation, and lightness will be described below.

Figure 11:
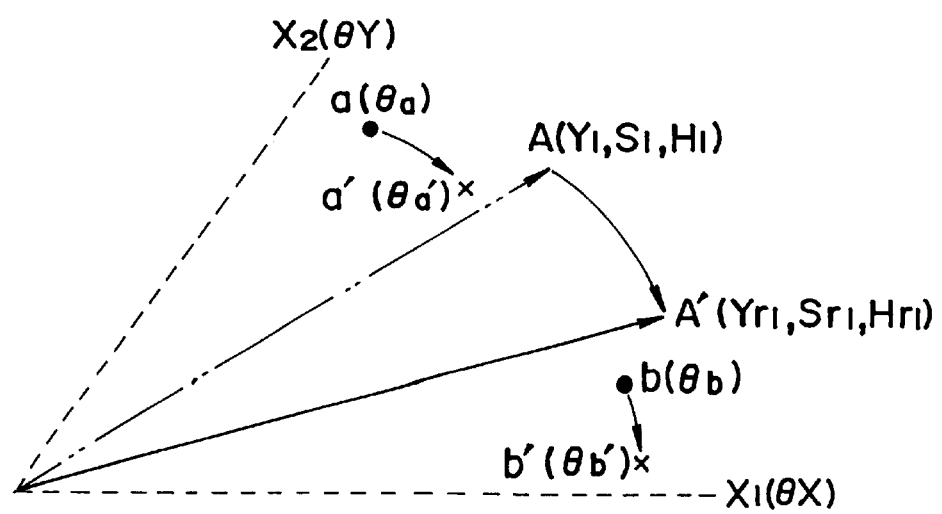
FIG. 11 is a schematic representation of the hue correction process according to the first embodiment of the invention.

First, referring to FIG. 11, hue adjustment processing is described below. The area between $X_1$ and $X_2$ is shown in FIG. 11. In this figure, The intersection of the boundary lines $X_1$ and $X_2$ is denoted by O, and the area between $X_1$ and $X_2$ is denoted by $\angle X_1 O X_2$. Furthermore, the hue value on the boundary line $X_1$ is denoted by $\theta X$, and the hue value on the boundary line $X_2$ is denoted by $\theta Y$. In the area $\angle X_1 O X_2$, the point representing the data (lightness, saturation, hue) sensed by a camera to be adjusted is denoted by $A(Y_1, S_1, H_1)$, and the point representing the data (lightness, saturation, hue) sensed by the reference camera is denoted by $A'(Y_{r1}, S_{r1}, H_{r1})$. Furthermore, the data (lightness, saturation, hue) sensed in the normal operation mode by the camera to be adjusted is represented by a point denoted by a in the area between the boundary line $X_2$ and A0 or a point denoted by b in the area between the boundary line $X_1$ and A0. The points a and b are moved to points a' and b', respectively, when hue correction (hue shift) is made. The hue values of points a, b, a', and b' (relative to the B-Y axis) are denoted by $\theta_a$, $\theta_b$, $\theta_a'$, and $\theta_b'$, respectively.

In the present embodiment, in either case of $H_1 \geq H_{r1}$ or $H_1 < H_{r1}$, the hue values $\theta_a'$ and $\theta_b'$ after the hue shift are given by $$\theta_a' = \theta Y - (\theta Y - \theta_a) \times (\theta Y - H_{r1})/(\theta Y - H_1)$$

$$\theta_b' = \theta X + (\theta_b - \theta X) \times (H_{r1} - \theta X)/(H_1 - \theta X) \quad (2)$$

According to the above equation (2), the hue correcting process is performed by the hue correction unit 55 shown in FIG. 4. The data on the right side of equation (2) other than the variables $\theta_a$ and $\theta^b$ are given as the setting data 53 by the CPU 61.

Figure 12A:
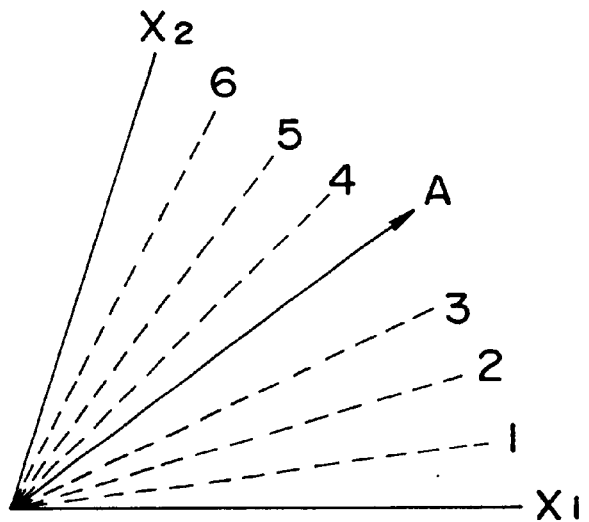
FIG. 12 is a schematic representation of the hue correction process according to the first embodiment of the invention.
Figure 12B:
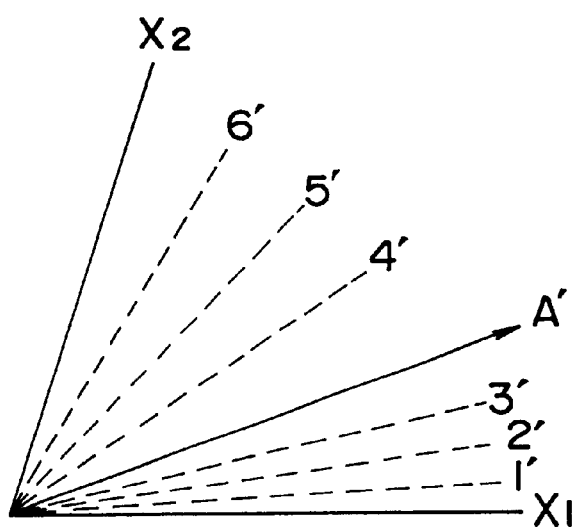

FIG. 12 is a conceptual representation of hue shifting process in which hue is shifted from original values (denoted by reference numerals 1–6 in FIG. 12a) to corrected values (denoted by reference numerals 1'–6' in FIG. 12b) within the area $\angle X_1 O X_2$. In the present embodiment, as can be seen from FIG. 12, the hue correction process is performed in such a manner that the ratio of the difference between the original hue and the hue on the boundary line to the difference between the shifted hue and the hue on the boundary line is equal to the ratio of the difference between the hue at point A and the hue on the boundary line to the difference between the hue at point A' and the hue on the boundary line.

Figure 13:
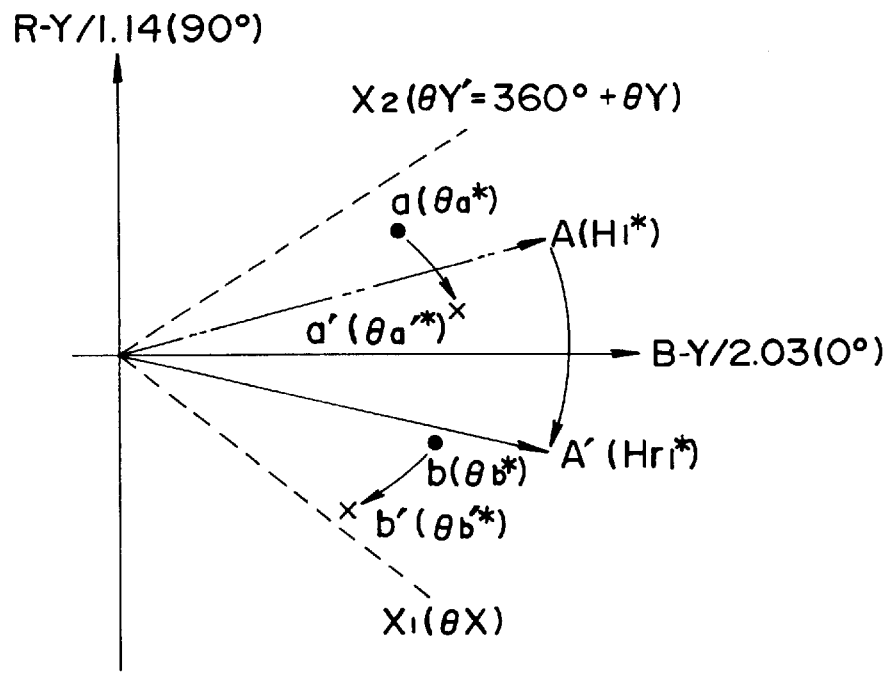
FIG. 13 is a schematic representation of the hue correction process which is performed for the case where the corresponding area extends across the B-Y axis, according to the first embodiment of the invention.

Although the hue correction process is performed basically in the above-described manner, if the area extends across the B-Y axis (that is, if the area includes both a part in the upper right quadrant and a part in the lower right quadrant), as shown in FIG. 13, the hue correction process should be performed in a modified manner as described below.

(1) When A, A', a, and b are located within the upper right quadrant (R-Y/1.14>0 and B-Y/2.03>0), the hue correction is performed using $H_1^*$, $H_{r1}^*$, $\theta_a^*$, and $\theta_b^*$ defined as follows:

$$H_1^* = 360° + H_1$$

$$H_{r1}^* = 360° + H_{r1}$$

$$\theta_a^* = 360° + \theta_a$$

$$\theta_b^* = 360° + \theta_b$$

(2) When A, A', a, and b are located within the lower right quadrant (R-Y/1.14<0 and B-Y/2.03>0), the hue correction is performed using $H_1^*$, $H_{r1}^*$, $\theta_a^*$, and $\theta_b^*$ defined as in the follows:

$$H_1^* = H_1$$
$$H_{r1}^* = H_{r1}$$
$$\theta_a^* = \theta_a$$
$$\theta_b^* = \theta_b$$

In either case of (1) or (2), $\theta Y^*$ is defined as follows.

$$\theta Y^* = 360° + \theta Y$$

When the area extends across the B-Y axis, in either case of $H_1 \geq H_{r1}$ or $H_1 < H_{r1}$, the shifted values of $\theta a'$ and $\theta b'$ are calculated according to the following equation (3) obtained by modifying equation (2).

$$\theta_a'^* = \theta Y^* - (\theta Y^* - \theta_a^*) \times (\theta Y^* - H_{r1}^*)/(\theta Y^* - H_1^*)$$

$$\theta_b'^* = \theta X + (\theta_b^* - \theta X) \times (H_{r1}^* - \theta X)/(H_1^* - \theta X) \quad (3)$$

where $\theta X$, $\theta Y$, $H_1$, $H_{r1}$, $\theta_a$, $\theta_b$, $\theta_a'$, and $\theta_b'$ are all expressed in phases measured in a counterclockwise direction with respect to the B-Y axis.

If $\theta_a'^*$ and $\theta_b'^*$ determined according to equation (3) are located in the upper right quadrant, $\theta_a'$ and $\theta_b'$ are calculated as follows.

$$\theta_a' = \theta_a'^* - 360°$$

$$\theta_b' = \theta_b'^* - 360°$$

If $\theta_a'^*$ and $\theta_b'^*$ determined according to equation (3) are located in the lower right quadrant, $\theta_a'$ and $\theta_b'$ are calculated as follows.

$$\theta_a' = \theta_a'^*$$
$$\theta_b' = \theta_b'^*$$

Figure 14:
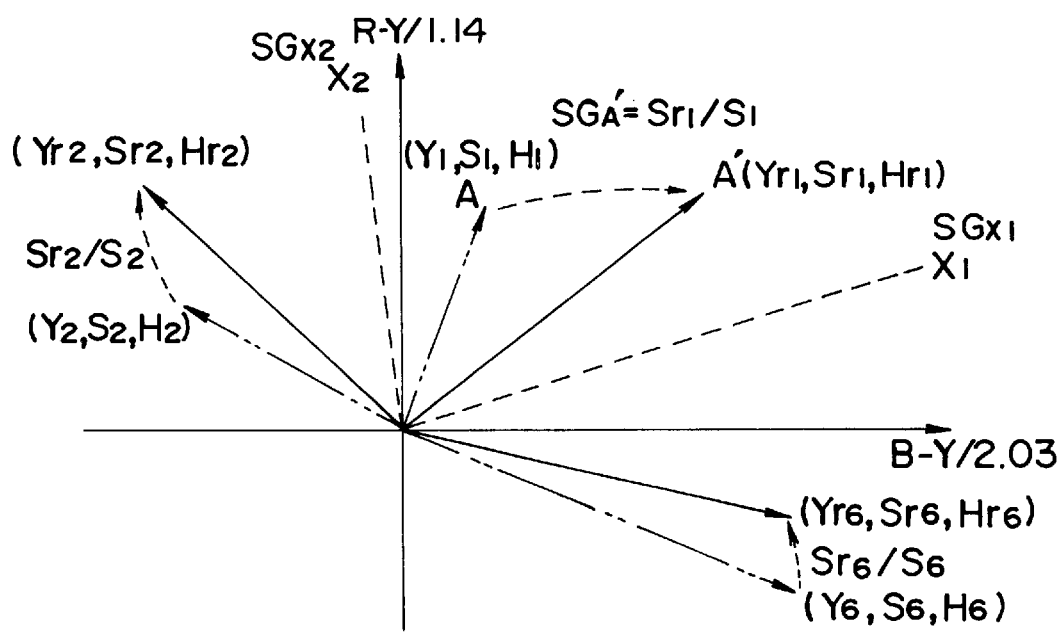
FIG. 14 is a schematic representation of the saturation correction process according to the first embodiment of the invention.

Now referring to FIG. 14, the correction process in terms of saturation is described below. FIG. 14 illustrates an area between $X_1$ and $X_2$ and also adjacent areas. As can be seen from this figure, the saturation level $S_1$ of point $A(Y_1, S_1, H_1)$ sensed by the camera to be adjusted can be adjusted with respect to the saturation level $S_{r1}$ of point $A'(Y_{r1}, S_{r1}, H_{r1})$ sensed by the reference camera by multiplying $S_1$ by $S_{r1}/S_1$. The factor such as $S_{r1}/S_1$ which is required in the multiplication to obtain the corrected saturation level from the original saturation level is herein referred to as the gain of saturation. The gain depends on the hue, and the gain for $H_{r1}$ is given by $S_{r1}/S_1$. This means that when the original hue is shifted to $H_{r1}$, the saturation level can be adjusted to the reference saturation level by multiplying the original saturation level by a factor of $S_{r1}/S_1$. Similarly, in FIG. 14, the gain for $H_{r2}$ is given by $S_{r2}/S_2$ and the gain for $Hr_{r6}$ is given by $S_{r6}/S_6$. The gain on an area boundary line ($X_1$ through $X_6$) is given by the average value of gains of areas which are separated from each other by the boundary line. For example, the gain $SG_{x1}$ on the boundary line $X_1$ is given as follows.

$$SG_{X1}=(S_{r1}/S_1+S_{r2}/S_2)/2$$

As described above, the gains of hues associated with the specified colors sensed by the reference camera and the gains on the area boundaries are determined from the color data 52 output from the CCU 30. In the normal operation in actual use, the hue gains for the adjusted cameras are calculated using the hue gains associated with the specified colors sensed by the reference camera and the gains of area boundary lines, as will be described in further detail below with reference to FIG. 15.

Figure 15:
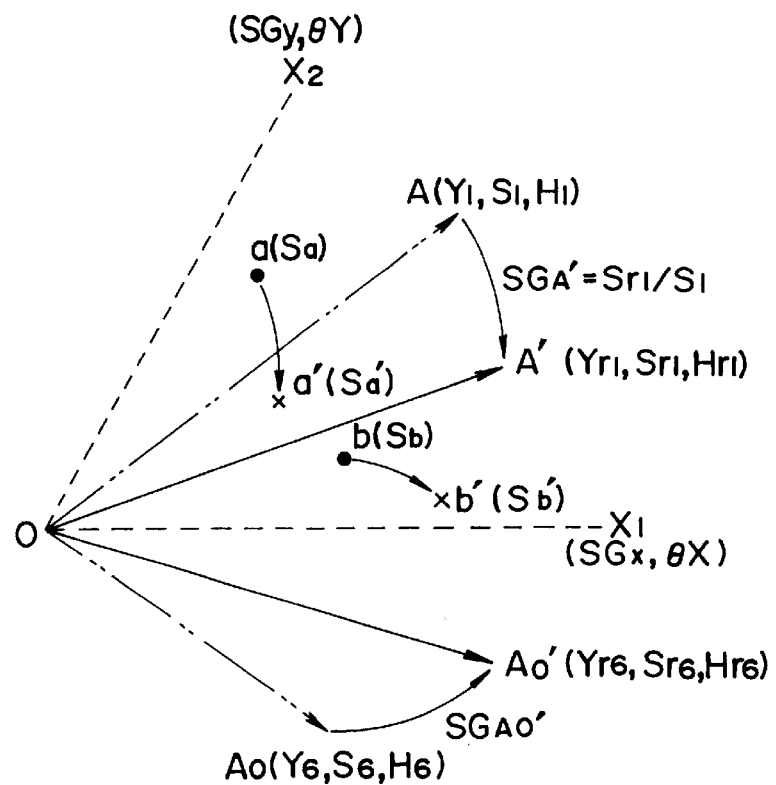
FIG. 15 is a schematic representation of the saturation correction process according to the first embodiment of the invention.

FIG. 15 illustrates the area between the boundary lines $X_1$ and $X_2$ and areas adjacent to this area. As in the hue correction process described above, the hue value on the boundary line $X_1$ in FIG. 15 is denoted by $\theta X$, and the hue value on the boundary line $X_2$ is denoted by $\theta Y$.

Herein it is assumed that the gain associated with point A' $(Y_{r1}, S_{r1}, H_{r1})$ in the area $\angle X_1 O X_2$ detected by the reference camera is given by $SG_A'=S_{r1}/S_1$, the gain on the boundary line $X_1$ is given by $SG_X$, and the gain on the boundary line $X_2$ is given by $SG_Y$. Furthermore, in FIG. 15, the gain associated with point $A_0'$ $(Y_{r6}, S_{r6}, H_{r6})$ in an area adjacent to the area $\angle X_1 O X_2$ is given by $SG_{A0}'$ $(=S_{r6}/S_6)$, and thus the gain $SG_X$ on the boundary line $X_1$ is given by $SG_X=(SG_A'+SG_{A0}')/2$.

In the normal operation mode, a data point (lightness, saturation, hue) detected in the normal operation mode by a camera to be adjusted is represented by a in the area between the boundary line $X_2$ and $A0$, and a data point (lightness, saturation, hue) detected by the camera to be adjusted is represented by b in the area between the boundary line $X_1$ and $A0$. Furthermore, the point to which the point a is moved via hue shift and saturation correction process is denoted by a', and the point to which the point b is moved via hue shift and saturation correction process is denoted by b'. The saturation values of points a, b, a', and b' are denoted by $S_a$, $S_b$, $S_a'$, and $S_b'$, respectively, and the hue values obtained after performing the hue shift on points a, and b are represented by $\theta_a'$ and $\theta_b'$, respectively.

In the present embodiment, in either case of $H_1 \geq H_{r1}$ or $H_1 < H_{r1}$, the corrected saturation values $S_a'$ and $S_b'$ are given by $$S_a'=\{SG_Y-(SG_Y-SG_A')\times(\theta Y-\theta_a')/(\theta Y-H_{r1})\}\times S_a$$
$$S_b'=\{SG_X-(SG_X-SG_A')\times(\theta_b'-\theta X)/(H_{r1}-\theta X)\}\times S_b \quad (4)$$

In the saturation correction process according to the above equation (4), on the basis of the hue gain for the specified color detected by the reference camera and also the gain on the area boundary line, the gain for an arbitrary hue between the hue of a specified color detected by the reference camera and the hue corresponding to the area boundary line is determined so that the gain varies in proportion to the hue. The above process according to equation (4) is performed by the saturation correction unit 56. $\theta_a'$ and $\theta_b'$ on the right side of equation (4) are given as the information about the result of the correction process performed by the hue correction unit 55, that is, they are given as a result of the process according to equation (2) or (3). The data on the right side of equation (4) other than the variables $\theta_a'$, $\theta_b'$, $S_a$, and $S_b$ are given as the setting data 53 by the CPU 61.

Although the saturation correction process is basically performed in the above-described manner, if the area extends across the B-Y axis, the saturation correction process should be performed according to a modified equation (5) shown below, as in the hue correction process described earlier.

$$S_a'=\{SG_Y-(SG_Y-SG_A')\times(\theta Y^*-\theta_a'^*)/(\theta Y^*-H_{r1}^*)\}\times S_a$$
$$S_b'=\{SG_X-(SG_X-SG_A')\times(\theta_b'^*-\theta X)/(H_{r1}^*-\theta X)\}\times S_b \quad (5)$$

In equation (5), $H_1^*$, $H_{r1}^*$, $\theta_a^*$, $\theta_b^*$, and $\theta Y^*$ are defined in a manner similar to that in the hue correction process described above, and $\theta_a'^*$ and $\theta_b'^*$ are determined according to equation (3).

The lightness correction process is performed in a manner similar to the hue correction process. That is, the lightness correction process can be accomplished by replacing each hue value used in the hue correction process described above by a corresponding lightness value. However, when the hue level is 0, that is, the signal is located on the Y axis, the signal must be a black-and-white signal having no color, and thus the signal value is directly output. The lightness correction process is performed by the lightness correction unit 57 shown in FIG. 4.

Now, the contents of the setting data will be described below. For each CCU 30, the CPU 61 calculates the variables in equations (2)–(5) and data other than $\theta_a'$ and $\theta_b'$ which are given by the hue correction unit 55 performed by the correction process. The results are given as the setting data 53 to each CCU 30. More specifically, the setting data 53 includes five kinds of data described below.

(1) The hue values on the area boundary lines ($X_1$ through $X_6$).

(2) The hues ($H_1$ through $H_6$) obtained by sensing the plurality of specified colors via each camera to be adjusted.

(3) The hues ($H_{r1}$ through $H_{r6}$) obtained by sensing the plurality of specified colors via the reference camera.

(4) The hue gains (such as $SG_{X1}$ through $SG_{X6}$, $SG_A'$).

(5) The lightness gain (similar to the hue gains).

Figure 16A:
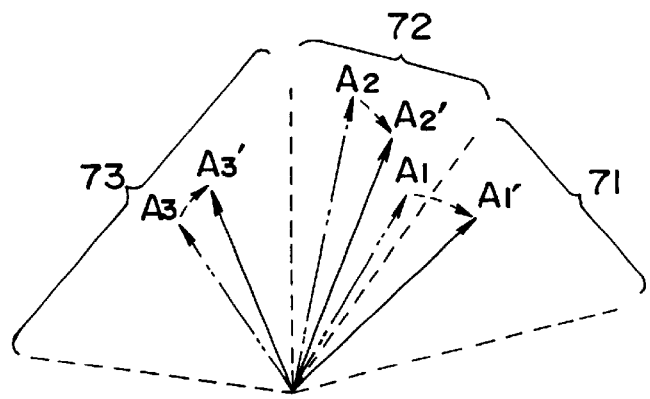
FIG. 16 is a schematic representation of the color data selection process according to the first embodiment of the invention.
Figure 16B:
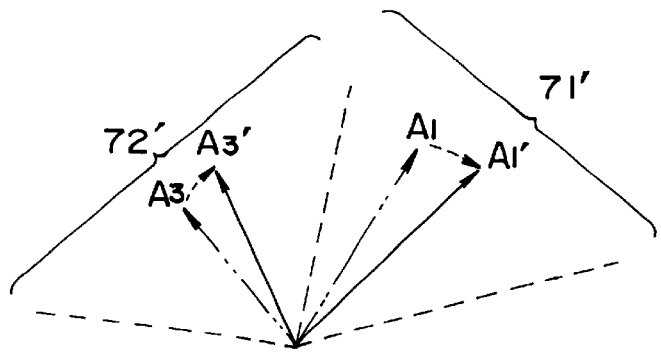

Referring now to FIG. 16, the color data selection which is performed (in step S108 in FIG. 7) when the color data for the plurality of specified colors detected by a camera to be adjusted are not all located in the same areas as the color data detected by the reference camera will be described below. FIG. 16a illustrates an example in which all sets of color data are not located in the same areas. In this figure, reference numerals 71–73 denote areas, $A_1'$–$A_3'$ denote color data points (lightness, saturation, hue) detected by the reference camera, and $A_1$–$A_3$ denote color data points (lightness, saturation, hue) corresponding to $A_1'$–$A_3'$, detected by a camera to be adjusted. In this specific example, the point $A_1$ is not located in the same area 71 as the point $A_1'$ but located in the area 72. In such a case, either the set of $A_1$ and $A_1'$ or the set of $A_2$, $A_2'$ is discarded, and the area is reconstructed. For example, as shown in FIG. 16b, the set of A2 and A2' is discarded and areas 71' and 72' are created. The above color data selection may be performed either in a manual fashion under the control and judgement of a user or in an automatic fashion under the control and the judgement of the CPU 61. When the color data selection is performed manually by the user, if there is a set of data which is not located in the same area, the CPU 61 may notify the user of the above fact via an indication displayed on the monitor, and may further display an image such as that shown in FIG. 16a so that the user may select color data by controlling a user interface while watching the monitor. This allows the user to select color data as he/she wants. For example, the user can select color data such that a set of color data associated with the flesh color remains without being discarded. When the color data selection is performed automatically by the CPU 61, the color data selection may be accomplished in such a manner that, of sets of color data which may be discarded to obtain sets of color data which no longer include a set of color data located in different areas, a set (sets) of color data which are more different than the other set(s) of color data remains (remain) without being discarded.

As described above, in the color correction apparatus, the color correction controller, and the color correction system according to the present invention, the color space is divided into a plurality of areas and color data is corrected for each area according to the predefined correction procedure thereby ensuring that the color correction is performed in an optimum fashion for each area. Although in the specific embodiment described above the color adjustment is performed for six colors and thus the color space is divided into six areas, the number of colors to be adjusted or the number of areas is not limited to six as long as each color data detected by a camera to be adjusted is located in the same area as the color data detected by the reference camera for the same color. This means that it is possible to make color adjustment among cameras for a great number of different colors using the color correction apparatus, the color correction controller, or the color correction system according to the present invention.

In conventional techniques, if cameras used in a broadcast studio include various types of cameras such as analog cameras and digital cameras having no capability of color adjustment in addition to digital cameras having the capability of color adjustment, it is required that color adjustment among those cameras should be performed by employing a camera having no capability of color adjustment as a reference camera to which the remaining cameras are adjusted. However, the camera having no capability of color adjustment is not always an adequate camera as the reference camera.

In contrast, in the present invention, the color correction processing unit 33 serving as the color correction apparatus is provided in the CCU 30 separated from the camera 10, and thus any camera in a studio can be employed as the reference camera by coupling the camera with the CCU 30.

Figure 17:
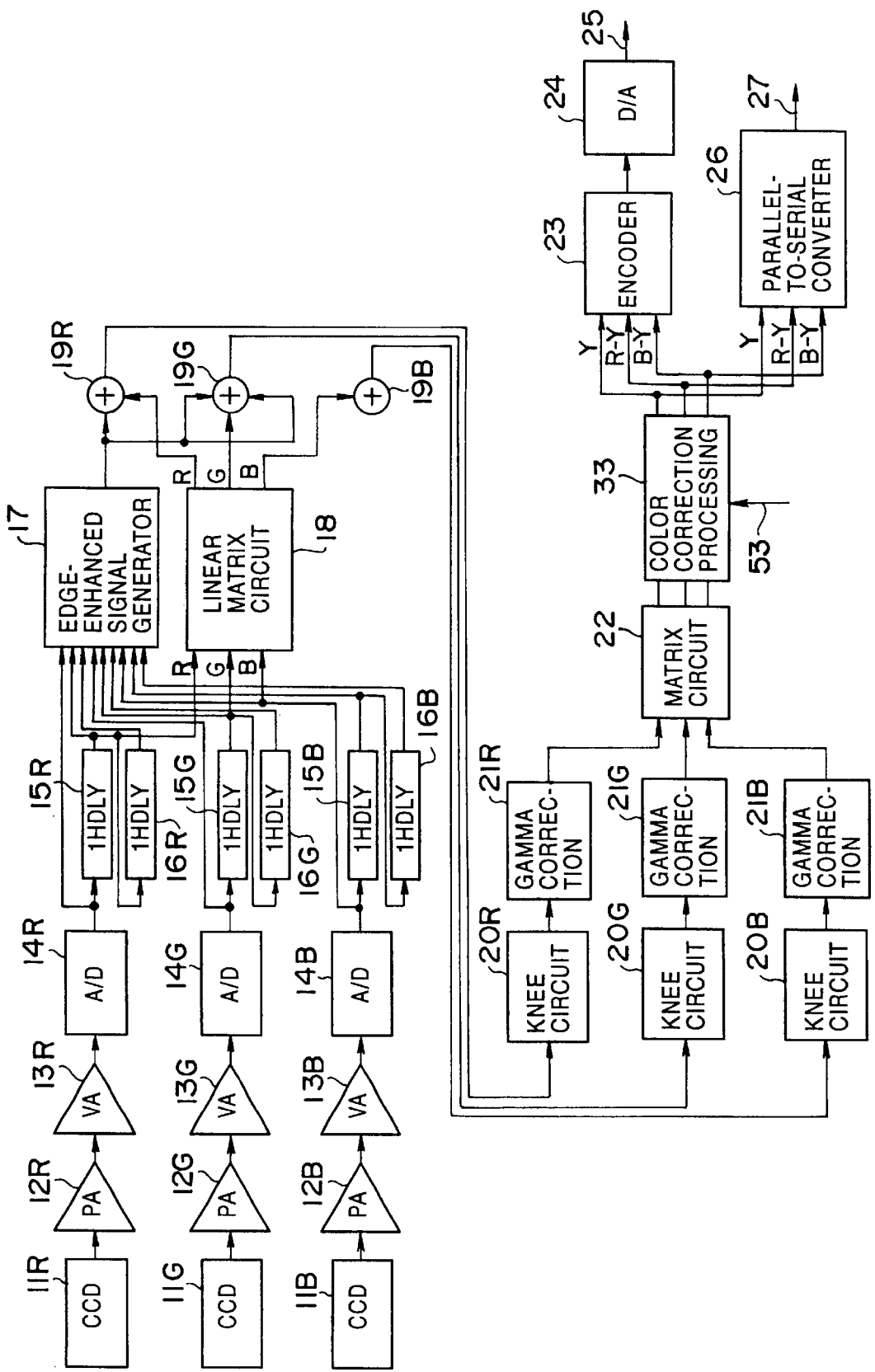
FIG. 17 is a block diagram illustrating the construction of a CHU including a color correction apparatus disposed in a camera, according to a second embodiment of the present invention.

FIG. 17 is a block diagram illustrating the construction of a CHU including a color correction apparatus disposed in a camera, according to a second embodiment of the present invention. In this second embodiment, a color correction processing unit 33 is disposed not in a CCU but in the CHU of the camera 10. As shown in FIG. 17, the color correction processing unit 33 is located at the stage following a matrix circuit 22 in the CHU. In the present embodiment of the invention, the CCU has the same construction as that shown in FIG. 1 except that the CCU no longer include the color correction processing unit 33. Except the above point, the construction and the operation in the second embodiment are the same as the first embodiment. In addition to the advantage resulting from the location of the color correction processing unit 33 in the CCU 30, the second embodiment also has similar advantages to those obtained in the first embodiment described above.

Although the present invention has been described above with reference to specific embodiments, it should be understood that it is not intended to limit the invention to those embodiments. For example, instead of determining the correction procedure performed by the correction means by using color data generated by the reference camera as the reference information, the correction procedure may also be determined using reference data which has been prepared in advance for each color of the color chart.

In the color correction apparatus according to the first aspect of the present invention, the color representation data generating means generates color representation data representing colors in accordance with the signal generated by the imaging means, and correction means corrects the color representation data in accordance with the correction procedure determined for each region in the color space so that the colors represented by the signal generated by the imaging means is adjusted with respect to the reference colors. This makes it possible to perform color adjustment for a great number of colors among a plurality of cameras in an optimum fashion for each region.

Preferably, the color representation data generating means and the correction means are disposed in the controller separately from the main part of the imaging apparatus. This provides, in addition to the above advantages, an additional advantage that any main part may be employed as the reference apparatus in the process of making color adjustment among a plurality of imaging apparatus.

In the color correction controller according to the second aspect of the invention, for each region in the color space corresponding to the plurality of particular colors, the procedure determining means determines the correction procedure performed by the correction means of the imaging apparatus, in accordance with the signal which is generated by the imaging means when sensing the plurality of particular colors and also in accordance with the information representing references for the plurality of particular colors, whereby the color correction controller controls the correction means in accordance with the correction procedure determined. This makes it possible to perform color adjustment for a great number of colors among a plurality of cameras in an optimum fashion for each region.

In the color correction system according to the third aspect of the invention, the procedure determining means determines, for each region in the color space corresponding to the plurality of particular colors, the correction procedure performed by the correction means of the imaging apparatus, in accordance with the signal which is generated by the imaging means when sensing the plurality of particular colors and also in accordance with the information representing references for the plurality of particular colors, the color representation data generating means generates color representation data representing colors in accordance with the signal generated by the imaging means, and correction means corrects the color representation data in accordance with the correction procedure determined for each region in the color space so that the colors represented by the signal generated by the imaging means is adjusted with respect to the reference colors. This also makes it possible to perform color adjustment for a great number of colors among a plurality of cameras in an optimum fashion for each region.

What is claimed is:

1. A color correction apparatus for use in an imaging apparatus, said imaging apparatus including imaging means for sensing the image of a subject and generating a signal including information pertaining to the colors of the subject, said color correction apparatus comprising:

color representation data generating means for generating color representation data of hue (H), lightness (Y) and saturation (S) representing colors of the image represented by the signal generated by said imaging means in the image sensing operation; and correction means which divides a color space in which the H, Y and S data is represented in coordinates, into a plurality of regions, and corrects the H, Y and S data generated by said color representation data generating means with respect to H, Y and S data representing a single reference color defined for each respective region, in accordance with a procedure determined for each region of said color space thereby adjusting a color represented by the signal generated by said imaging means with respect to the reference color of the region within which the represented color falls;

wherein corrected hue is determined in accordance with the following expressions:

$$\theta a' = \theta Y - (\theta Y - \theta a) \times (\theta Y - Hr1)/(\theta Y - H1);$$

$$\theta b' = \theta X + (\theta b - \theta X) \times (Hr1 - \theta X)/(H1 - \theta X)$$

where,
- $\theta Y$ is a hue value of a first boundary of the color space region within which the color representation data falls;
- $\theta X$ is a hue value of an opposite boundary of said color space region;
- $\theta a$ is a pre-shift hue value for a point, associated with the generated signal, on a first side of said color space region between a reference hue value and said first boundary;
- $\theta a'$ is a shifted hue value for the point corresponding to hue value $\theta a$;
- $\theta b$ is a pre-shift hue value for a point, associated with the generated signal, on a second side of a color space region between said reference hue value and said opposite boundary;
- $\theta b'$ is a shifted hue value for the point corresponding to hue value $\theta b$;
- Hr1 is said reference hue value; and
- H1 is a hue value of said imaging apparatus for the same color corresponding to said reference hue value.

2. A color correction apparatus according to claim 1, wherein:
   said imaging apparatus includes: a main part including said imaging means; and a controller for controlling said main part, said controller being disposed separately from said main part; and
   said color representation data generating means and said correction means are disposed in said controller.

3. The color correction controller according to claim 1 wherein said correction means performs a different hue correction procedure if the region that the color representation data falls within extends across a B-Y axis of said color space.

4. A color correction system for use with an imaging apparatus, said imaging apparatus including imaging means for sensing the image of a subject and generating a signal including information pertaining to the colors of the subject, said color correction system comprising:
   color representation data generating means for generating color representation data of hue (H), lightness (Y) and saturation (S) representing colors of the image represented by the signal generated by said imaging means in the image sensing operation; and
   correction means which divides a color space in which the H, Y and S data is represented in coordinates, into a plurality of regions, and corrects the H, Y and S data generated by said color representation data generating means with respect to H, Y and S data representing a single reference color defined for each respective region, in accordance with a procedure determined for each region of said color space thereby adjusting a color represented by the signal generated by said imaging means with respect to the reference color of the region within which the represented color falls;
   procedure determining means for determining the procedure of dividing the color space into the plurality of regions corresponding to a plurality of said reference colors, and determining a correction procedure performed by said correction means for each said region, in accordance with the signal which is generated by said imaging means when sensing said plurality of reference colors and also in accordance with the color representation data for said plurality of reference colors, so that said color correction controller controls said correction means in accordance with the correction procedure determined;

wherein:
   said procedure determining means is connected to a reference camera with respect to which color adjustment is performed and is also connected to one or more other cameras to be adjusted in terms of color characteristics with respect to said reference camera,
   the signal generated by the imaging means of said reference camera when sensing said plurality of reference colors is employed to derive said H, Y and S data for the reference colors; and
   for each said camera to be adjusted, the correction procedure performed by the correction means of each said camera to be adjusted is determined on the basis of said H, Y and S data for the reference colors and also the signal generated by the imaging means of each said camera to be adjusted when sensing said plurality of reference colors.

5. A color correction controller for controlling correction means provided in an imaging apparatus, said imaging apparatus comprising:
   imaging means for sensing the image of a subject and generating a signal including information pertaining to the colors of the subject; color representation data generating means for generating color representation data of hue (H), lightness (Y) and saturation (S) representing colors of the image represented by the signal generated by said imaging means in the image sensing operation; and
   said correction means divides a color space in which the H, Y and S data is represented in coordinates, into a plurality of regions, and corrects the H, Y and S data generated by said color representation data generating means with respect to H, Y and S data representing a single reference color defined for each respective region, in accordance with a procedure determined for each region of said color space thereby adjusting a color represented by the signal generated by said imaging means with respect to the reference color of the region within which the represented color falls;
   said color correction controller comprising procedure determining means for determining the procedure of dividing the color space into the plurality of regions corresponding to a plurality of said reference colors, and determining a correction procedure performed by said correction means for each said region, in accordance with the signal which is generated by said imaging means when sensing said plurality of reference colors and also in accordance with the color representation data for said plurality of reference colors, so that said color correction controller controls said correction means in accordance with the correction procedure determined;

wherein corrected hue is determined in accordance with the following expressions:

$$\theta a' = \theta Y - (\theta Y - \theta a) \times (\theta Y - Hr1)/(\theta Y - H1);$$

$$\theta b' = \theta X + (\theta b - \theta X) \times (Hr1 - \theta X)/(H1 - \theta X)$$

where,

θY is a hue value of a first boundary of the color space region that the color representation data falls within;

θX is a hue value of an opposite boundary of said color space region;

θa is a pre-shift hue value for a point, associated with the generated signal, on a first side of said color space region between a reference hue value and said first boundary;

θa' is a shifted hue value for the point corresponding to hue value θa;

θb is a pre-shift hue value for a point, associated with the generated signal, on a second side of a color space region between said reference hue value and said opposite boundary;

θb' is a shifted hue value for the point corresponding to hue value θb;

Hr1 is said reference hue value; and

H1 is a hue value of said imaging apparatus for the same color corresponding to said reference hue value.

6. The color correction controller according to claim 5 wherein said correction means performs a different hue correction procedure if the region that the color representation data falls within extends across a B-Y axis of said color space.

7. A color correction apparatus for use in an imaging apparatus, said imaging apparatus including imaging means for sensing the image of a subject and generating a signal including information pertaining to the colors of the subject, said color correction apparatus comprising:

color representation data generating means for generating color representation data of hue (H), lightness (Y) and saturation (S) representing colors of the image represented by the signal generated by said imaging means in the image sensing operation; and correction means which divides a color space in which the H, Y and S data is represented in coordinates, into a plurality of regions, and corrects the H, Y and S data generated by said color representation data generating means with respect to H, Y and S data representing a single reference color defined for each respective region, in accordance with a procedure determined for each region of said color space thereby adjusting a color represented by the signal generated by said imaging means with respect to the reference color of the region within which the represented color falls;

wherein corrected saturation is determined in accordance with the following:

$$S_a' = \{SG_Y - (SG_Y - SG_A') \times (\theta Y - \theta_a')/(\theta Y - H_{r1})\} \times S_a$$

$$S_b' = \{SG_X - (SG_X - SG_A') \times (\theta_b' - \theta X)/(H_{r1} - \theta X)\} \times S_b,$$

where,

θX is a hue value of a first boundary line $X_1$ of the color space region within which the color representation data falls;

θY is a hue value of an opposite boundary line $X_2$ of said color space region;

$SG_X$ is saturation gain on the boundary line $X_1$;

$SG_Y$ is saturation gain on the boundary line $X_2$;

$S_a$ is a pre-correction saturation value for a first point, "a", associated with the generated signal, on a first side of said color space region between a value A' of the reference color and the first boundary line $X_1$;

$S_a'$ is a corrected saturation value associated with a point, a', which is shifted from the first point due to corrected saturation and hue shift;

$S_b$ is a pre-correction saturation value for a second point, b, associated with the generated signal, on a second side of said color space region between the reference color value and the second boundary line $X_2$;

$S_b'$ is a corrected saturation value associated with a point, b', which is shifted from the second point due to corrected saturation and hue shift;

$\theta_a'$ is a shifted hue value associated with the point a';

$\theta_b'$ is a shifted hue value associated with the point b';

$SG_A'$ is a saturation gain associated with the reference color value A'; and $H_{r1}$ is a reference hue value associated with the reference color value A'.

8. The color correction controller according to claim 7 wherein said correction means performs a different saturation correction procedure if the region within which the color representation data falls extends across a B-Y axis of said color space.

* * * * *